(12) United States Patent
Vandiver et al.

(10) Patent No.: US 11,423,003 B2
(45) Date of Patent: Aug. 23, 2022

(54) OPTIMISTIC CONCURRENCY CONTROL FOR DATABASE TRANSACTIONS

(71) Applicant: EntIT Software LLC, Sunnyvale, CA (US)

(72) Inventors: Benjamin M. Vandiver, Cambridge, MA (US); Styliani Pantela, Cambridge, MA (US); Jaimin Dave, Cambridge, MA (US)

(73) Assignee: MICRO FOCUS LLC, Santa Clara, CA (US)

( * ) Notice: Subject to any disclaimer, the term of this patent is extended or adjusted under 35 U.S.C. 154(b) by 514 days.

(21) Appl. No.: 15/837,724

(22) Filed: Dec. 11, 2017

(65) Prior Publication Data

US 2019/0179930 A1 Jun. 13, 2019

(51) Int. Cl.
*G06F 16/23* (2019.01)

(52) U.S. Cl.
CPC ...... *G06F 16/2315* (2019.01); *G06F 16/2343* (2019.01); *G06F 16/2365* (2019.01)

(58) Field of Classification Search
CPC ............. G06F 16/2315; G06F 16/2365; G06F 16/2343
See application file for complete search history.

(56) References Cited

U.S. PATENT DOCUMENTS

| | | | |
|---|---|---|---|
| 5,960,436 A * | 9/1999 | Chang | G06F 9/466 |
| 6,134,558 A * | 10/2000 | Hong | G06F 16/284 |
| 6,772,154 B1 * | 8/2004 | Daynes | G06F 16/2343 |
| 6,850,938 B1 * | 2/2005 | Sadjadi | G06F 16/2343 |
| 6,999,977 B1 * | 2/2006 | Norcott | G06F 16/254 |
| 7,933,881 B2 | 4/2011 | Richey et al. | |
| 8,533,440 B2 | 9/2013 | Levanoni et al. | |
| 9,336,258 B2 | 5/2016 | Bhattacharjee et al. | |
| 9,513,811 B2 | 12/2016 | Wein et al. | |
| 9,535,934 B1 * | 1/2017 | Bahl | G06F 16/214 |
| 9,679,003 B2 | 6/2017 | Bhattacharjee et al. | |
| 2007/0219999 A1 * | 9/2007 | Richey | G06F 16/2343 |
| 2007/0239943 A1 * | 10/2007 | Dice | G06F 9/466 711/147 |
| 2008/0294648 A1 * | 11/2008 | Lin | G06F 16/2343 |
| 2010/0082538 A1 * | 4/2010 | Rentsch | G06F 16/24539 707/616 |
| 2010/0153953 A1 * | 6/2010 | Adl-Tabatabai | G06F 16/2329 718/101 |

(Continued)

OTHER PUBLICATIONS

Wu, Yingjun; "An Empirical Evaluation of In-Memory Multi-Version Concurrency Control"; Proceedings of the VLDB Endowment, vol. 10, No. 7, Endowment 2150-8097/17/03; 2017, 12 pages.

*Primary Examiner* — Ashish Thomas
*Assistant Examiner* — Yohanes D Kelemework

(57) ABSTRACT

A technique includes performing optimistic concurrency control to process a request associated with a transaction to change a schema of an object. Performing the optimistic concurrency control includes locally modifying the object to change the schema of the object based on the request; after locally modifying the object, locking a global catalog to block the object from being globally modified; validating the locally modified object based on the global catalog; and committing the modified object to a globally shared storage in response to the modified object being validated.

19 Claims, 7 Drawing Sheets

(56) References Cited

U.S. PATENT DOCUMENTS

| | | | |
|---|---|---|---|
| 2011/0231447 A1* | 9/2011 | Starkey | G06F 16/27 |
| | | | 707/792 |
| 2016/0350357 A1* | 12/2016 | Palmer | G06F 16/2315 |
| 2017/0177698 A1 | 6/2017 | Lee et al. | |
| 2018/0322156 A1* | 11/2018 | Lee | G06F 16/2343 |
| 2018/0336258 A1* | 11/2018 | Lee | G06F 16/219 |

* cited by examiner

OPTIMISTIC CONCURRENCY CONTROL FOR DATABASE TRANSACTIONS

BACKGROUND

A database system allows large volumes of data to be stored, managed and analyzed. Data records for a relational database system may be associated with tables. A table may include one or more rows, where each row may contain a set of related data (e.g., data related to a single entity). The data for the row may be arranged in a series of fields, or columns, where each column includes a particular type of data (e.g., type of characteristic of an entity). Processing nodes of the database system may process queries, which are inquires expressed in a specified format (e.g., a Structured Query Language (SQL) format) for such purposes as analyzing, searching and retrieving data.

DETAILED DESCRIPTION

Figure 1:
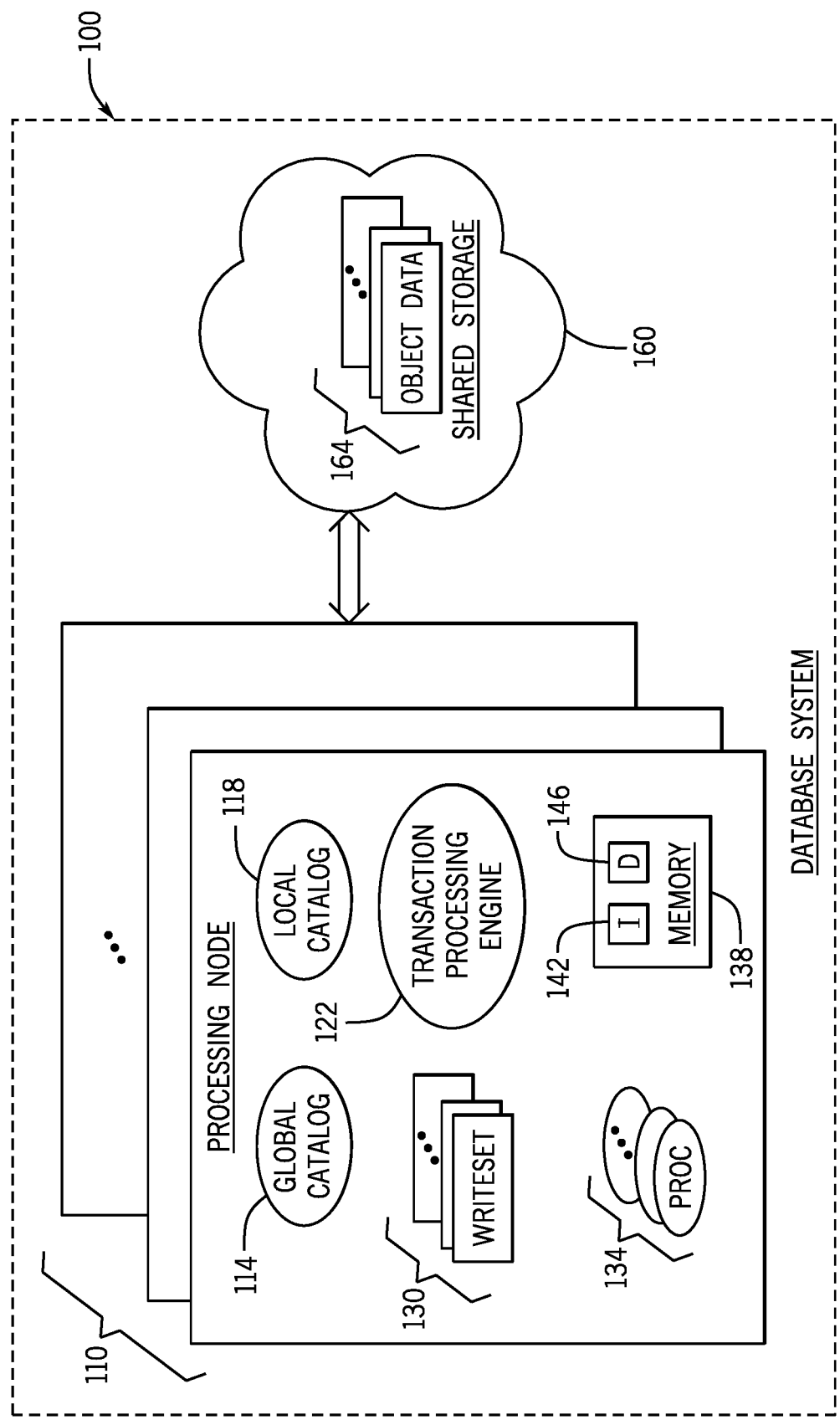
FIG. 1 is a schematic diagram of a database system using optimistic concurrency control to process transactions that change object schema according to an example implementation.

A database system may include one or multiple processing nodes that process user requests for database transactions (transactions associated with queries, data load operations, Data Description Language (DDL) operations, and so forth) for purposes of accessing, analyzing and managing data that is stored in a storage of the system. In this context, a "processing node" (also referred to herein as a "database node") refers to a physical machine, such as a physical machine that contains a hardware processor (a central processing unit (CPU), one or multiple CPU cores, and so forth). As examples, the processing node may be a personal computer, a workstation, a server, a rack-mounted computer, a special purpose computer, and so forth. A "transaction" refers to one or multiple operations, which are executed as a unit of work.

In accordance with example implementations, the data may be structured as "objects," such as table and projections. In this context, a "projection" refers to a selected set of one or multiple columns of a table. A given object, such as a table, may not contain data, but rather the object may contain metadata and be associated with a corresponding set of object data. Moreover, the database system may employ column-based storage (i.e., may be a "column store"). This type of column storage may be beneficial for read-intensive workloads because, for purposes of processing a given query, the query may target a subset of table columns (i.e., a projection) thereby allowing the processing node to read a selected subset of columns, rather than read entire rows.

The database system may have one of many different types of storage, depending on the application which the database system serves. For example, a business enterprise may have a database system that is deployed on-site and has direct attached storage. The direct attached storage allows the database system to have a relatively high input/output (I/O) bandwidth and correspondingly be capable of processing queries in an efficient manner. As another option, the database system may be cloud-based, which is a distributed system that allows the number of active nodes to be scaled based on user load.

The storage may be a "shared storage," which is a storage that may be shared or accessed by multiple processing nodes. A given database object, when committed, or stored, in the shared storage has an associated set of metadata. In this context, the "metadata" for a given object, refers to data that describes and gives information about the database object. For example, the object may be a table, and the metadata associated with the table may represent the schema (the organization and structure) of the table, the name of the table, the version of the table, and so forth. In accordance with example implementations, the metadata may be "global metadata," which refers to metadata that is associated with objects that have been published, or committed, to the shared storage or "local metadata," which is associated with objects that are local for a given processing node and have not been published, or committed, to the shared storage.

A "global catalog" contains the global metadata for the objects that have been committed to storage, and in accordance with example implementations, each processing node contains a copy of the same global catalog. Each processing node also contains a copy of a "local catalog," which refers to the metadata for unpublished, or uncommitted, objects that have been modified locally on the processing node.

When processing a given transaction, a processing node may generate a set of data, called a "writeset," which represents local versions of the one or multiple database objects that result from the node processing the transaction. The processing node may commit a given writeset to the shared storage such that the committing of the writeset updates the affected shared objects in the global storage (i.e., the global metadata and the object data in the shared storage are updated).

As part of the preliminary stages of the process to commit a writeset, a processing node may validate the writeset, which refers to a process in which the processing node checks the version(s) of the database object(s) associated with the writeset against the version(s) of the committed database object(s) to make sure that the writeset does not contain stale data. For example, to validate a given locally modified object, a processing node may compare a version number of the locally modified object with a version number represented by the global catalog to determine whether the local version number is equal to the version number represented by the global catalog. Once validated, the processing node may then complete the commit process, which involves storing the associated data to the shared storage and updating the global catalog. In accordance with example implementations, if the writeset is not validated, the processing node aborts, or rolls back, the transaction.

A given processing node may process a transaction that is associated with changing the schema of a given database object. For example, an Add Column Data Definition Language (DDL) transaction is a transaction that is directed to adding a column to a table. One way to process such a transaction is for the processing node to acquire a consistency lock on the global metadata at the onset of processing the Add Column transaction, before the processing node generates the writeset. In this manner, a "consistency lock" refers to a mechanism that blocks any of the global objects from being modified until the consistency lock is released. In accordance with example implementations, a processing node may acquire a consistency lock by requesting and acquiring a lock on the global catalog. Thus, one way for a processing node to process an Add Column transaction request, is for the processing node, at the onset of the processing, to acquire a lock on the global catalog to prevent any of the committed, global database objects from being modified during the processing of the Add Column transaction.

The acquiring of the consistency lock at the onset of processing the Add Column transaction request is pessimistic in nature and is referred to as "pessimistic concurrency control" herein. In this manner, the pessimistic nature of the concurrency control assumes that there is a likelihood that the global objects being modified as part of the Add Column transaction processing may be changed (by other processing nodes and even by another transaction processed by the same node) due to the parallel processing of other transactions. Such an approach, however, effectively serializes the processing of database transactions when an Add Column transaction is being processed, thereby potentially becoming a bottleneck for the database system.

In accordance with example implementations that are described herein, a processing node may process an Add Column transaction using an "optimistic concurrency control" in which the processing node acquires the consistency lock (i.e., the lock on the global metadata for all global objects) after the processing node generates the writeset for the Add Column transaction. Although a result of this approach may be that some writesets are not validated (thereby resulting in rollbacks of the corresponding transactions), the approach allows parallel processing when consistency problems do not arise.

As a more specific example, FIG. 1 depicts a distributed relational database system 100 in accordance with some implementations. Depending on the particular implementation, the database system 100 may be a public cloud-based system, a private cloud-based system, a hybrid-based system (i.e., a system that has public and private cloud components), a private system disposed on site, a private system geographically distributed over multiple locations, and so forth.

The database system 100 includes one or multiple processing nodes 110; and each processing node 110 may include one or multiple personal computers, work stations, servers, rack-mounted computers, special purpose computers, and so forth. Depending on the particular implementation, the processing nodes 110 may be located at the same geographical location or may be located at multiple geographical locations. Moreover, in accordance with example implementations, multiple processing nodes 110 may be rack-mounted computers, such that sets of the processing nodes 110 may be installed in the same rack.

In accordance with example implementations, the processing nodes 110 may be coupled to a shared storage 160 of the database system 100 through network fabric (not shown in FIG. 1). In general, the network fabric may include components and use protocols that are associated with any type of communication network, such as (as examples) Fibre Channel networks, iSCSI networks, ATA over Ethernet (AoE) networks, HyperSCSI networks, local area networks (LANs), wide area networks (WANs), global networks (e.g., the Internet), or any combination thereof.

The shared storage 160 may include one or multiple physical storage devices that store data using one or multiple storage technologies, such as semiconductor device-based storage, phase change memory-based storage, magnetic material-based storage, memristor-based storage, and so forth. Depending on the particular implementation, the storage devices of the shared storage 160 may be located at the same geographical location or may be located at multiple geographical locations.

Regardless of its particular form, the shared storage 160 stores global object data 164 for the global objects of the database system 100 (i.e., the data for the committed, or published, objects). As noted herein, the shared storage 160 may be shared in the sense that the shared storage 160 may be commonly accessible by multiple and different processing nodes 110 of the database system 100.

In accordance with example implementations, information about the objects that are associated with the object data 164 is represented by global metadata. In accordance with example implementations, each processing node 110 stores data representing a global catalog 114, which is a set of global metadata that represents information about the organization and structure of the global objects.

As also depicted in FIG. 1, each processing node 110, in accordance with example implementations, stores local metadata in the form of a local catalog 118. In this manner, the local catalog 118 for a given processing node 110 represents information pertaining to local objects, whose data may be stored on the processing node 110 and has not been committed to the shared storage 160.

In accordance with example implementations that are described herein, the processing node 110 includes a transaction processing engine 122, which is constructed to apply optimistic concurrency control for transactions that change the schema of database objects. For the specific example implementations that are described herein, an example of such a transaction that changes schema is an Add Column DDL operation. It is noted that in accordance with further example implementations, the transaction processing engine 122 may apply optimistic concurrency control to process transactions other than transactions associated with Add Column DDL requests.

As depicted in FIG. 1, a given processing node 110 may store one or multiple sets of data, called "writesets 130," which refer to uncommitted data generated by the transaction processing engine 122. To commit a particular writeset 130 to the shared storage 160, the transaction processing engine 122 undergoes a process called "validation," in which the transaction processing engine 122 compares the version(s) of the object(s) represented by the writeset 130 to the global version number(s) represented by the global catalog 114. In accordance with example implementations, validation of a given object means that the version of the object at the time of the modification matches the current version of the object. If validation succeeds, the transaction engine 122 commits the writeset 130 to the shared storage 160 (i.e., the transaction engine 122 performs actions to cause the corresponding global metadata to be updated and the corresponding object data 164 to be updated/stored. Otherwise, if validation fails, the transaction processing engine 122 aborts, or rolls back, the transaction (i.e., the associated writeset 130 is discarded and the changes are not globally published).

In accordance with example implementations, the transaction processing engine 122 processes an Add Column transaction request by holding off on locking the global metadata for all of the global objects (called a "consistency lock" or "global catalog lock" herein) until the writeset 130 for the transaction has been processed. The approach is optimistic in the sense that the writeset 130 is generated, assuming that validation of the objects associated with the writeset 130 will occur, and If not, the transaction processing engine 122 rolls back the transaction. The transaction processing engine 122 commits the writeset 130 if validation succeeds.

In accordance with example implementations, the processing node 110 may include one or multiple physical hardware processors 134, such as one or multiple central processing units (CPUs), one or multiple CPU cores, and so forth. Moreover, the processing node 110 may include a local memory 138. In general, the local memory 138 is a non-transitory memory that may be formed from, as examples, semiconductor storage devices, phase change storage devices, magnetic storage devices, memristor-based devices, a combination of storage devices associated with multiple storage technologies, and so forth.

Regardless of its particular form, the memory 138 may store various data 146 (data representing the global catalog 114, data representing the local catalog 118, one or multiple writesets 130, and so forth). The memory 138 may share instructions 142 that, when executed by one or multiple processors 134, cause the processor(s) 134 to form one or multiple components of the processing node 110, such as, for example, the transaction processing engine 122. In accordance with example implementations, the memory 138 may store instructions 142 that, when executed by the processor(s) 134, cause the processor(s) 134 to use optimistic concurrency control to process Add Column DDL transactions, as described herein.

Figure 2:
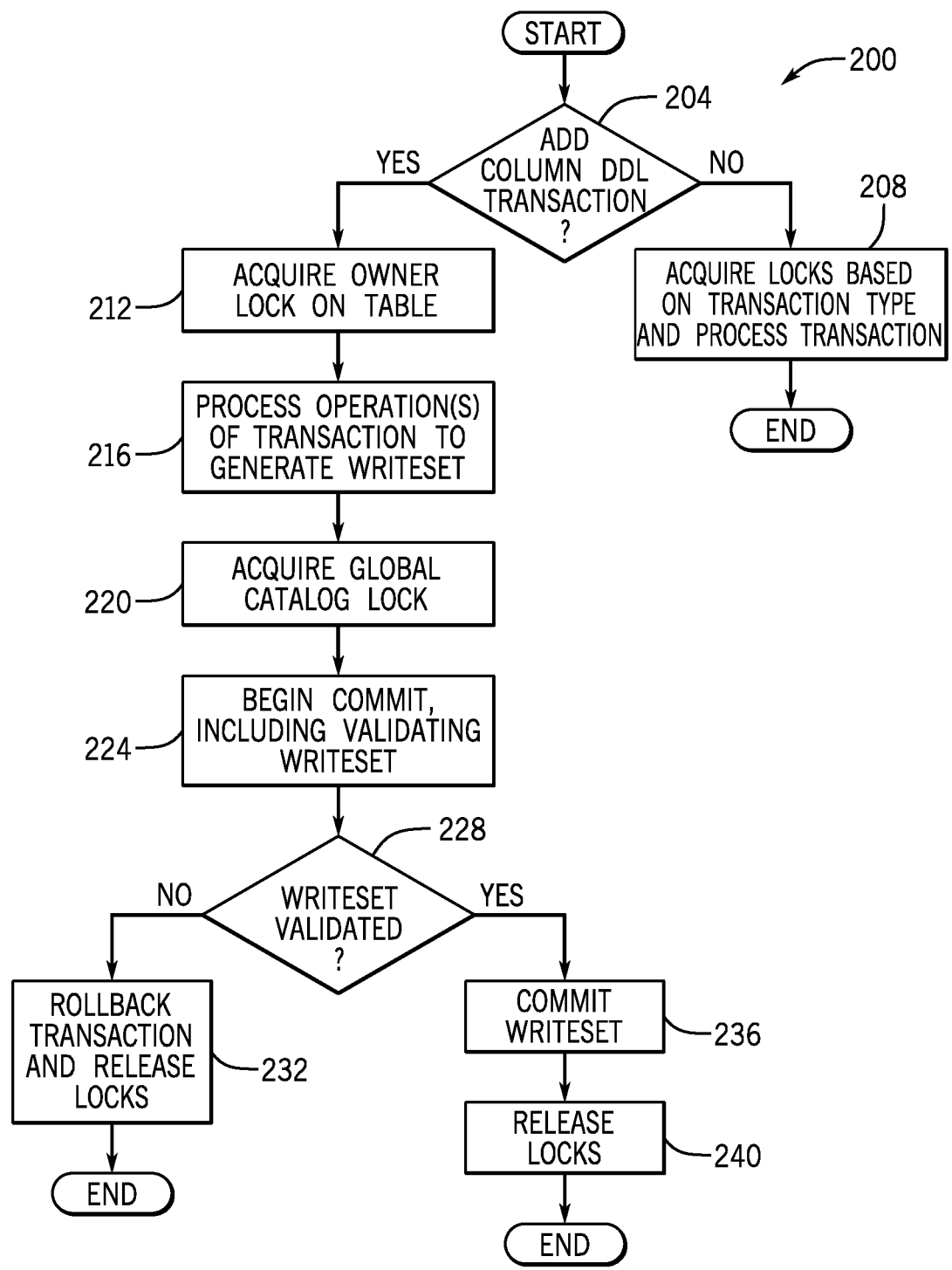
FIG. 2 is a flow diagram depicting a technique used by a transaction processing engine of the database system to process transaction requests according to an example implementation.

Referring to FIG. 2, in conjunction with FIG. 1, in accordance with example implementations, the transaction processing engine 122 may perform a technique 200. Pursuant to the technique 200, the transaction processing engine 122 determines (decision block 204) whether a received request is an Add Column DDL transaction request. If not, the transaction processing engine 122 acquires (block 208) the appropriate locks based on the transaction type and processes the transaction.

Otherwise, if, pursuant to decision block 204, the transaction processing engine 122 determines that the request is an Add Column DDL transaction request, then the transaction processing engine 122 acquires (block 212) an owner lock on the table associated with the Add Column DDL transaction. The "owner lock," in turn, is a global lock on the table. Pursuant to block 216, the transaction processing engine 122 processes the one or multiple operations of the transaction to generate the corresponding writeset 130; and after the generation of the writeset, the transaction processing engine 122 acquires a global catalog lock (i.e., a global consistency lock which prevents global changes to all objects), pursuant to block 220. The transaction processing engine 122 then begins a process to commit the writeset 130 to the shared storage 160, including validating the writeset, as depicted in block 224. If the writeset is validated (decision block 228) then the transaction processing engine 122 commits (block 236) the writeset and releases (block 240) the global and local locks. Otherwise, if the writeset was not validated, the transaction processing engine 122 rolls back the transaction and releases the locks, pursuant to block 232.

Figure 3:
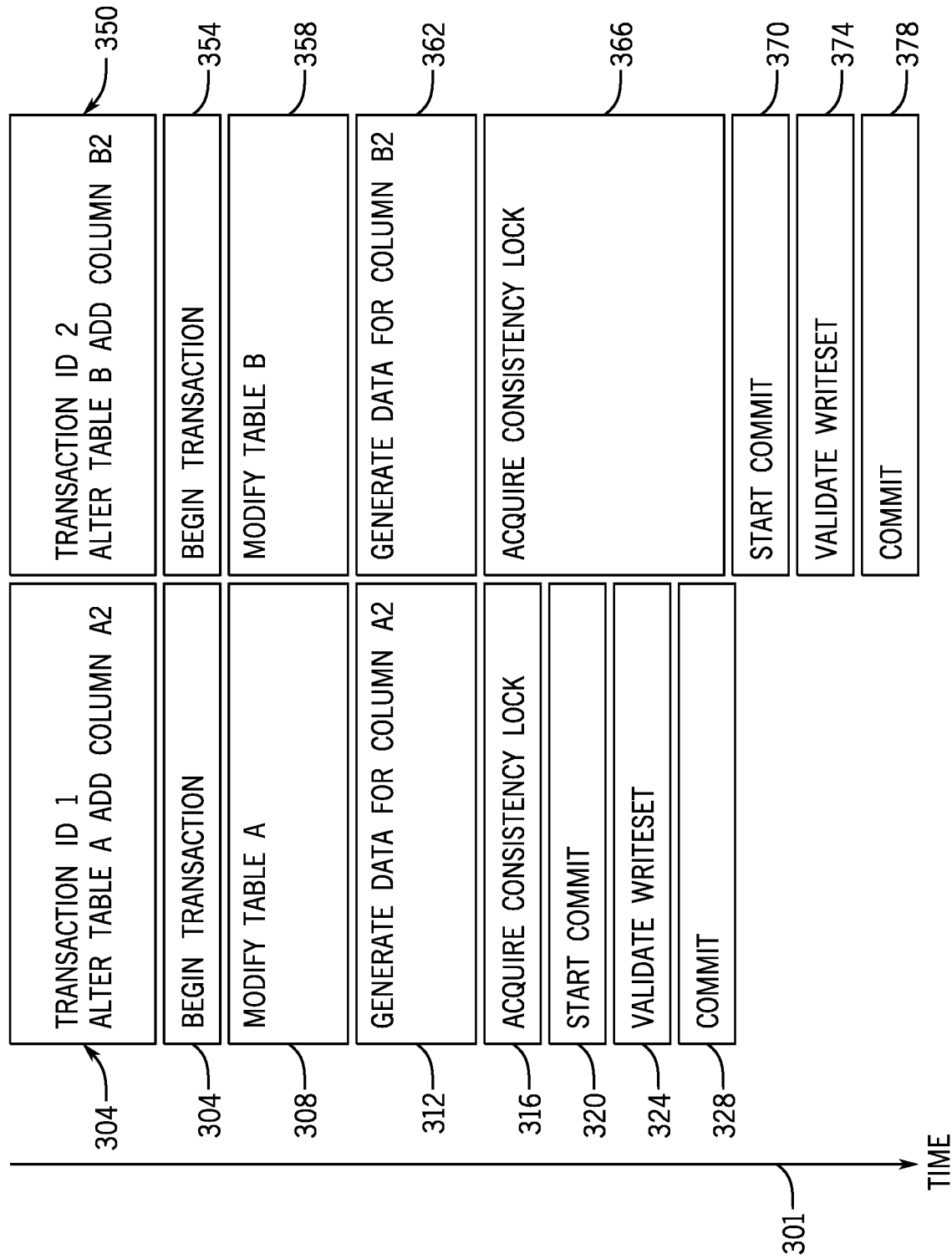
FIGS. 3 and 4 are illustrations of the processing of parallel transactions where at least one of the transactions is an Add Column Data Definition Language (DDL) transaction according to example implementations.

FIG. 3 depicts two Add Column transactions 304 and 350 that are processed by the database system 100 in parallel, using optimistic concurrency control. Referring to FIG. 3 in conjunction with FIG. 1, it is noted that the transactions 304 and 350 may be processed by the same processing node 110 or may be processed by different processing nodes 110 of the database system 100 in a time sequence, according to a time line 301. Moreover, in this context, the "parallel processing" of the transactions 304 and 350 refers to at least some parts of the processing of the transactions 304 and 350 overlapping in time.

The transaction 304 involves operations, or processing stages, to alter Table A by adding a column A2 to Table A, and the transaction 350 involves operations, or processing stages, to alter a Table B by adding a column B2 to the Table B. Neither transaction 304 nor transaction 350 modifies an object of the other transaction 304, 350.

As depicted in FIG. 3, the transaction 304 includes a beginning stage 304 in which an ownership lock of Table A is acquired (i.e., a global lock for just Table A); a stage 308 in which new metadata for the Table A is created to create the new column A2; a stage 312 in which the writeset 130 is generated to create the data for the new column A2; a stage 316 in which a global consistency lock, also referred to herein as a "global metadata lock," or "global catalog lock", is acquired (i.e., global lock for all of the objects); a start commit stage 320; a validate writeset stage 324 and finally, a commit stage 328.

The transaction processing engine 122 processes the transaction 350 sequentially, in accordance with the time line 301 and includes a stage 354 in which an ownership lock of Table B is acquired; a stage 358 in which new metadata for Table B is added to add the new column B2 to Table B; a stage 362 in which the writeset corresponding to the new data for column B2 is generated; a stage 366 in which a global consistency lock is acquired; a start commit stage 370; a validate writeset stage 374; and a commit stage 378.

As depicted in FIG. 3, due to the consistency lock not being acquired at the onset of either transaction 304 or 350 (i.e., the corresponding consistency locks are acquired after generation of the writesets), at least part of the transactions 304 and 350 may be performed in parallel. Otherwise, if the consistency lock were acquired at the beginning of either transaction 304, or 350, this would force the transactions 304 and 350 to be processed serially.

Figure 4:
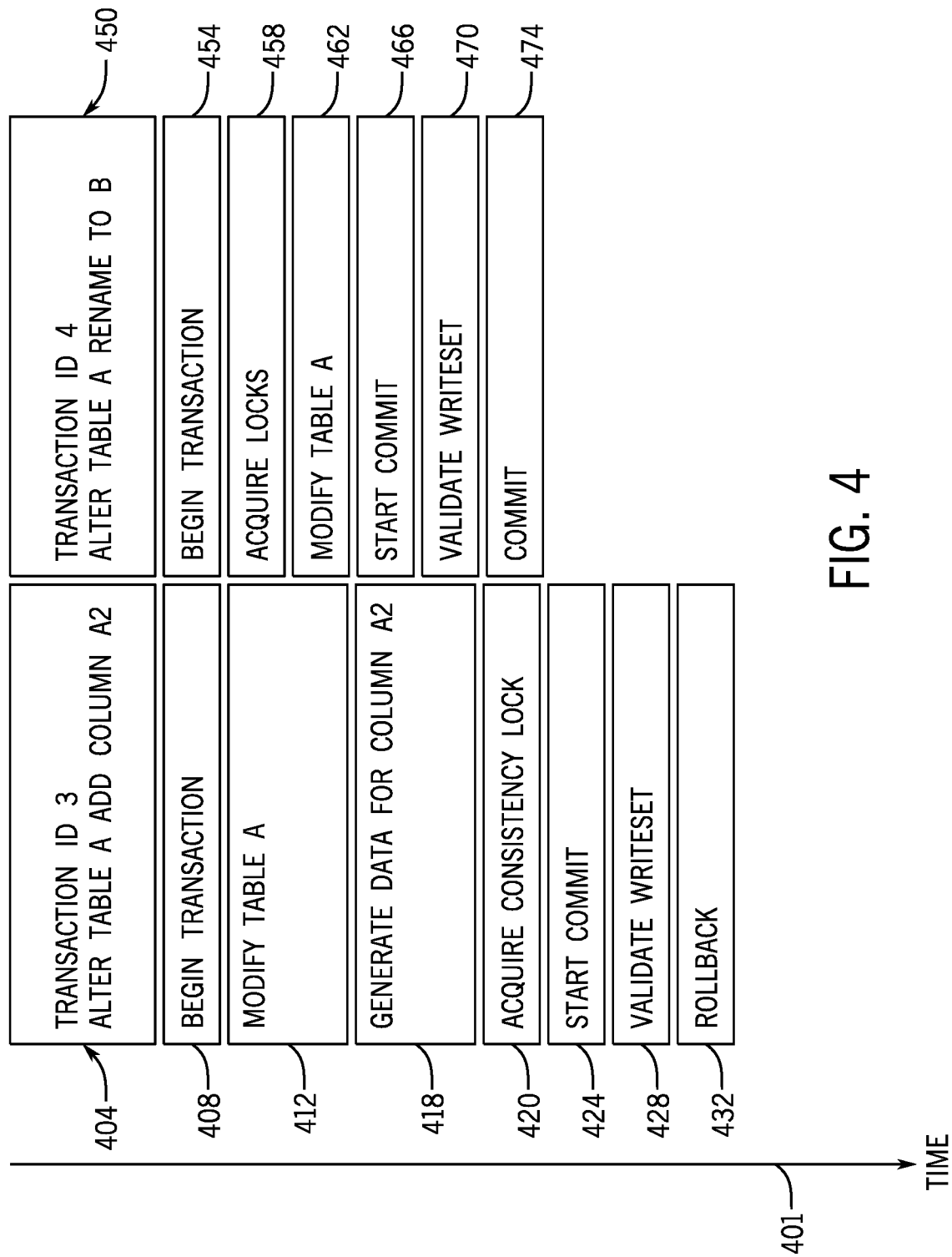
Figure 5:
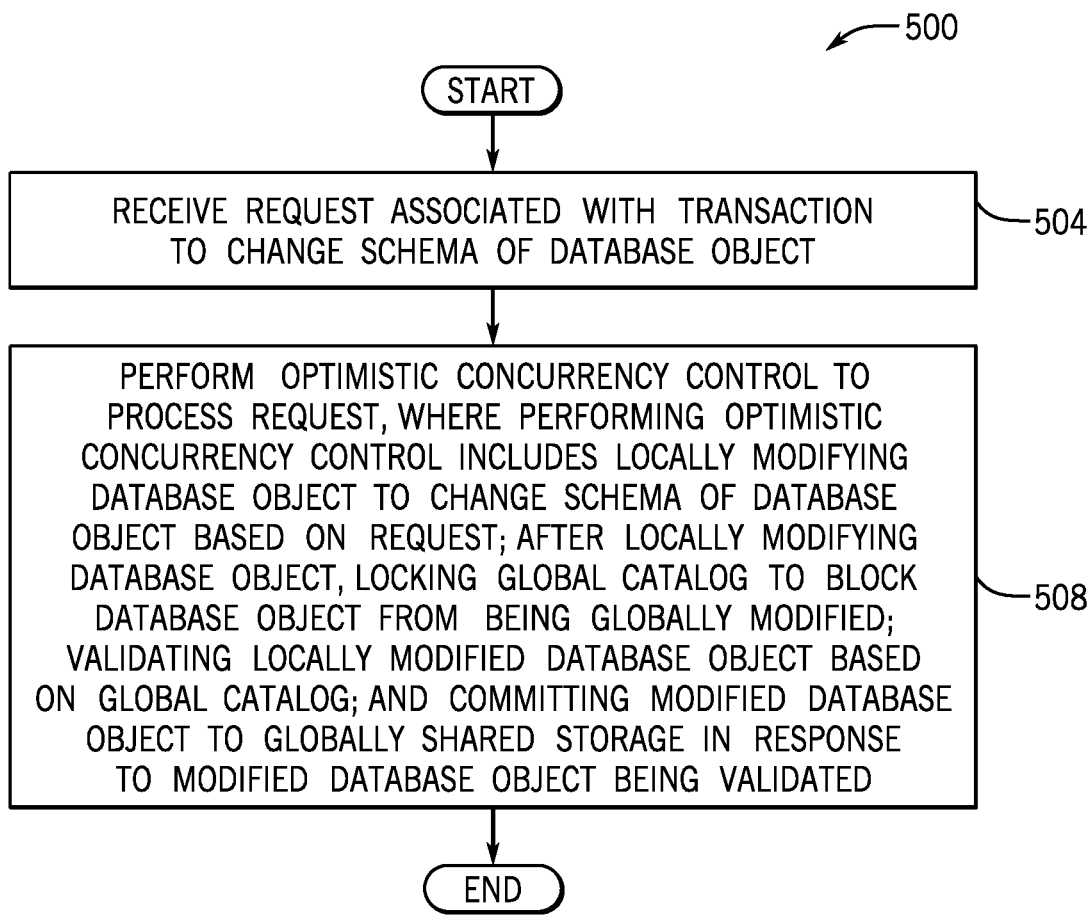
FIG. 5 is a flow diagram depicting a technique to use optimistic concurrency control to process a request associated with a transaction to change the schema of a database object according to an example implementation.

FIG. 4 depicts another set of example transactions 404 and 450 that are processed using optimistic concurrency control: the transaction 404 alters Table A to add a column A2 to Table A; and the transaction 450 alters Table A to rename Table A to Table B. For this example, the transactions 404 and 450 conflict in that both transactions 404 and 450 change metadata pertaining to Table A. This is a case in which the optimistic concurrency control results in a rollback.

More specifically, the transaction 404 includes an initial operation, or processing stage 408, in which, using the optimistic concurrency control scheme described herein, the transaction processing engine 122 acquires an ownership lock of Table A, but the engine 122 does not acquire a consistency lock. The transaction 404 includes a subsequent stage 412 in which the transaction processing engine 122 generates new metadata for Table A to add the new column A2 and a stage 416 to generate the corresponding writeset for the data for column A2. The processing of transaction 404 includes a stage 420 in which the transaction processing engine 122 acquires a consistency lock in the start commit stage 412.

The transaction 450 includes a stage 454 in which the processing of the transaction begins; a stage 458 in which locks are acquired; a stage 462 in which the metadata for Table A is modified to rename Table A to Table B; a stage 466 in which a commit of the writeset begins; a stage 470 in which the writeset is validated; and a stage 474 in which the writeset is committed. As depicted in FIG. 4, the writeset for the transaction 450 is committed before the writeset for the transaction 404 is validated.

In stage 428 of the transaction 404, validation of the writeset then occurs. However, as depicted in FIG. 4, the validation stage 428 occurs after a commit stage 474 of the transaction 450. Accordingly, the validation fails, and the processing of the transaction includes a rollback stage 432 to undue, or abort, the modified writeset.

Thus, in accordance with example implementations, a technique 500 includes receiving (block 504) a request associated with a transaction to change a schema of a database object and performing (block 508) optimistic concurrency control to process the request. Performing the optimistic concurrency control includes locally modifying the database object to change the schema of the object based on the request; after locally modifying the database object, locking a global catalog to block the object from being globally modified; validating the locally modified database object based on the global catalog; and committing the modified database object to a globally shared storage in response to the modified database object being validated.

Figure 6:
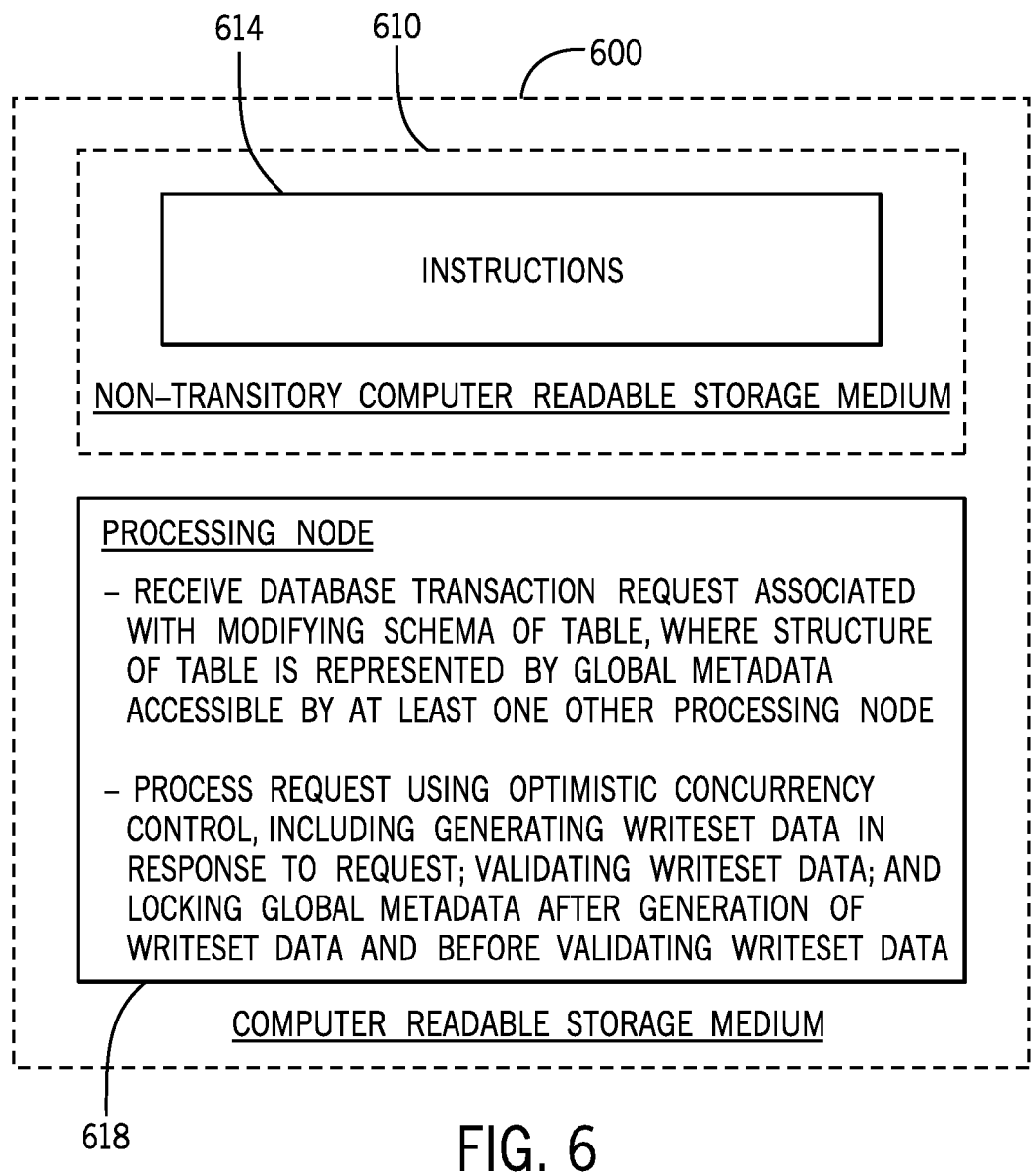
FIG. 6 is an illustration of a non-transitory computer readable storage medium that stores instructions that, when executed by a processing node of a database system, causes the processing node to use optimistic concurrency control to process a request associated with modifying schema of a table according to an example implementation.

Referring to FIG. 6, in accordance with example implementations, a non-transitory computer readable storage medium 600 stores instructions 614 that, when executed by a processing node 618 of a database system, causes the processing node 618 to receive a database transaction request associated with modifying schema of a table. The table is one of a plurality of objects, whose structures are represented by global metadata, which is accessible by at least one other processing node. The processing node processes the request using optimistic concurrency control, including generating writeset data in response to the request; validating the writeset data; and locking the global metadata after generation of the writeset data and before validation of the writeset data.

Figure 7:
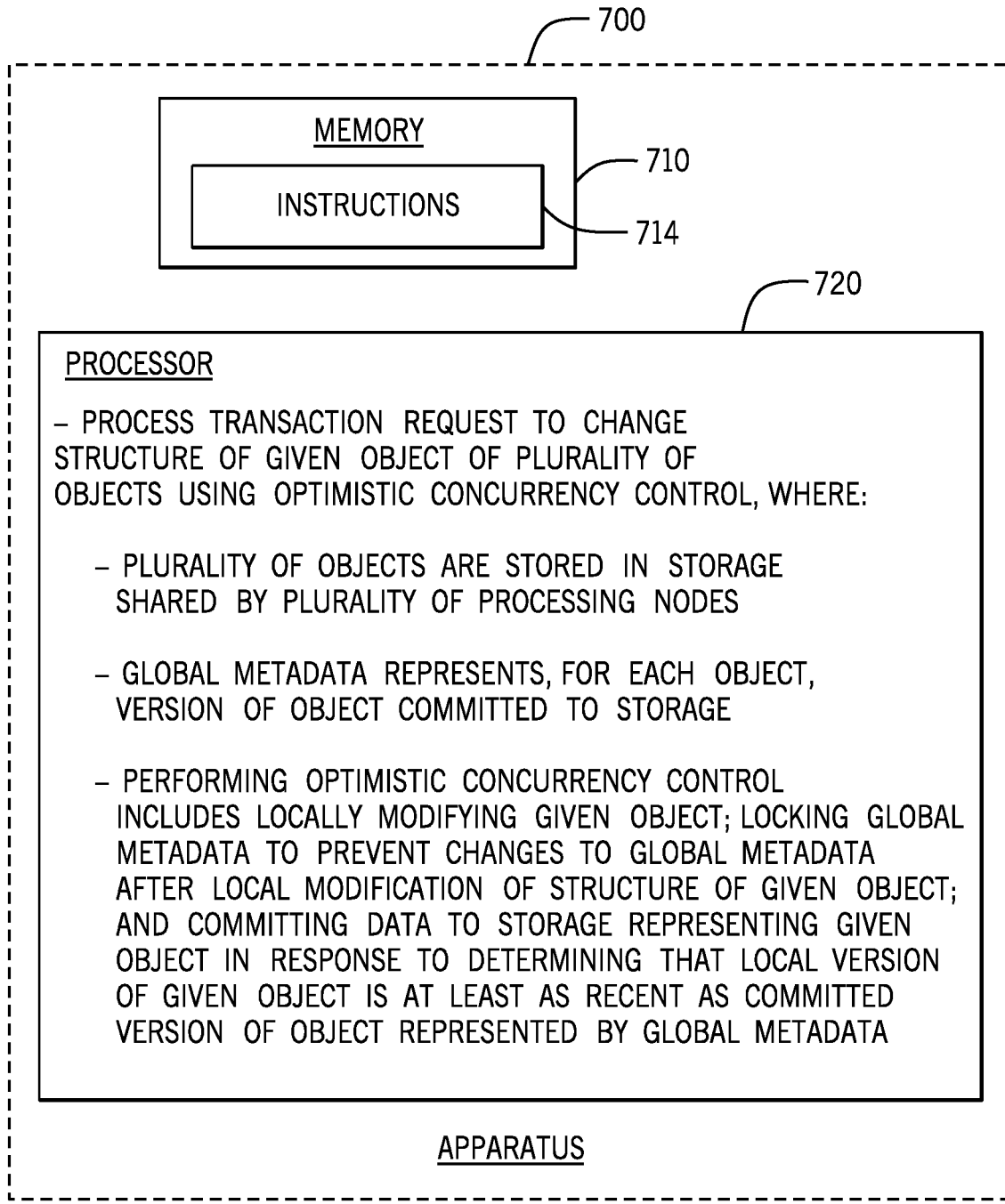
FIG. 7 is a schematic diagram of an apparatus to process a transaction request to change a structure of an object according to an example implementation.

Referring to FIG. 7, in accordance with example implementations, an apparatus 700 includes a processor 730 and a memory 710. The memory 710 stores instructions 714 that, when executed by the processor 730, cause the processor to process a transaction request to change a structure of a given object of a plurality of objects using optimistic concurrency control. The plurality of objects are stored in a storage, which is shared by a plurality of processing nodes, and global metadata represents, for each object of the plurality of objects, a version of the object, which is committed to the storage. Using the optimistic concurrency control includes locally modifying the structure of the given object; locking the global metadata to prevent changes to the global metadata after the local modification of the structure of the given object; and committing data to the storage representing the given object in response to determining that the local version of the given object is at least as recent as the committed version of the object represented by the global metadata.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
receiving, by a processor of a first computing device, a request for a transaction to change a structure of a first table stored on the first computing device, wherein the first table contains local database objects of the first computing device, and the first computing device further stores a copy of a global catalog of global database objects stored in a global storage;
in response to receiving the request to change the structure of the first table, locking only the first table on the first computing device to prevent changes to the local database objects in the first table;
after locking only the first table, processing the transaction in the request to change the structure of the first table to generate a writeset, wherein the writeset includes a set of data representing a new version of the first table;
after generating the writeset representing the new version of the first table, locking the global catalog in the global storage to prevent changes to the global database objects in the global storage;
validating the writeset based on the global catalog; and
in response to the writeset being validated, committing the writeset to the global catalog by updating the global catalog in the global storage to include the set of data in the writeset.

2. The method of claim 1, wherein the transaction to change the structure of the first table comprises adding a column to the first table.

3. The method of claim 1, wherein the request comprises a data definition language (DDL) operation request.

4. The method of claim 1, wherein validating the writeset based on the global catalog comprises comparing the local database objects in the new version of the first table against the global database objects in the global storage.

5. The method of claim 1, further comprising:
after committing the writeset to the global catalog, releasing the locking of the global catalog and the locking of the first table.

6. The method of claim 1, wherein the locking of the first table comprises acquiring an ownership lock on the first table.

7. The method of claim 1, further comprising:
in response to the writeset not being validated, rolling back the transaction and unlocking the first table.

8. A non-transitory computer readable storage medium storing instructions that, when executed by a processing node of a database system, cause the processing node to:
receive a request for modifying a structure of a first table stored on the processing node, wherein the first table contains local database objects of the processing node, and the processing node further stores a copy of a global catalog of global database objects stored in a global storage;
in response to receiving the request for modifying the structure of the first table, lock only the first table on the processing node to prevent changes to the local database objects in the first table, without locking the global catalog in the global storage;

after locking only the first table, process the request to modify the first table and generate writeset data representing a new version of the first table;

after generating the writeset data representing the new version of the first table, lock all the global catalog in the global storage to prevent changes to the global database objects in the global storage;

validate the writeset data based on the global catalog; and in response to the writeset data being validated, commit the writeset data to the global catalog in the global storage by updating the global catalog to include the writeset data.

9. The non-transitory computer readable storage medium of claim 8, wherein the instructions that cause the processing node to validate the writeset data include instructions that cause the processing node to compare the local database objects in the new version of the first table against the global database objects in the global storage.

10. The non-transitory computer readable storage medium of claim 8, wherein the instructions, when executed by the processing node, further cause the processing node to:

in response to the writeset data not being validated, roll back the modification of the first table and unlock the first table.

11. The non-transitory computer readable storage medium of claim 8, wherein the request is a request to add a column to the first table.

12. The non-transitory computer readable storage medium of claim 8, wherein the instructions further cause the processing node to:

after committing the writeset data to the global catalog, release the locking of the global catalog and the locking of the first table.

13. The non-transitory computer readable storage medium of claim 8, wherein the request comprises a request of for modifying structures of a plurality of tables including the first table.

14. A computing device comprising:

a local storage storing a first table containing local database objects and a copy of a global catalog of global database objects stored in a global storage:

a processor, and a memory storing instructions that, when executed by the processor, cause the processor to:

in response to receiving a request for a transaction to change a structure of the first table on the computing device, lock only the first table to prevent changes to the local database objects in the first table without locking the global catalog in the global storage;

after locking only the first table, process the transaction in the request to change the structure of the first table to generate a writeset, wherein the writeset includes a set of data representing a new version of the first table;

after generating the writeset representing the new version of the first table, lock the global catalog in the global storage to prevent changes to the global database objects in the global storage;

validate the writeset based on the global catalog; and in response to the writeset being validated, commit the writeset to the global catalog in the global storage by updating the global catalog to include the set of data in the writeset.

15. The computing device of claim 14, wherein the transaction to change the structure of the first table comprises adding a column to the first table.

16. The computing device of claim 14, wherein the request comprises a data definition language (DDL) operation.

17. The computing device of claim 14, wherein the instructions, when executed by the processor, further cause the processor to:

after committing the writeset to the global catalog, release the locking of the global catalog and the locking of the first table.

18. The computing device of claim 14, wherein the instructions that cause the processor to validate the writeset include instructions that cause the processor to compare the local database objects in the new version of the first table against the global database objects in the global catalog.

19. The computing device of claim 14, wherein the instructions cause the processor to:

in response to the writeset not being validated, roll back the transaction and unlock the first table.

* * * * *